(12) United States Patent
Kimura et al.

(10) Patent No.: US 7,626,671 B2
(45) Date of Patent: Dec. 1, 2009

(54) LCD DEVICE HAVING SCANNING LINES AND COMMON LINES

(75) Inventors: Shigeru Kimura, Tokyo (JP); Hiroaki Tanaka, Tokyo (JP); Akira Fujita, Tokyo (JP); Kiyofumi Kudou, Tokyo (JP); Takahiko Watanabe, Tokyo (JP); Hiroyuki Uchida, Kagoshima (JP); Akitoshi Maeda, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 332 days.

(21) Appl. No.: 11/152,422

(22) Filed: Jun. 14, 2005

(65) Prior Publication Data

US 2005/0248521 A1 Nov. 10, 2005

Related U.S. Application Data

(62) Division of application No. 09/965,566, filed on Sep. 27, 2001, now Pat. No. 6,930,741.

(30) Foreign Application Priority Data

Sep. 28, 2000 (JP) ............................. 2000-296978

(51) Int. Cl.
*G02F 1/1345* (2006.01)
(52) U.S. Cl. ...................................................... 349/150
(58) Field of Classification Search .................... None
See application file for complete search history.

(56) References Cited

U.S. PATENT DOCUMENTS

| 5,659,375 | A | | 8/1997 | Yamashita et al. |
| 5,670,994 | A | * | 9/1997 | Kawaguchi et al. ......... 345/206 |
| 5,867,139 | A | | 2/1999 | Tanaka et al. |
| 6,661,476 | B1 | | 12/2003 | Abe et al. |

FOREIGN PATENT DOCUMENTS

| JP | 06175158 A | 6/1994 |
| JP | 7-36061 | 2/1995 |
| JP | 2000-47242 | 2/2000 |

* cited by examiner

*Primary Examiner*—David Nelms
*Assistant Examiner*—Lucy P Chien
(74) *Attorney, Agent, or Firm*—Scully, Scott, Murphy & Presser, P.C.

(57) ABSTRACT

An active matrix LCD device includes a TFT panel, a counter panel and liquid crystal interposed therebetween. The TFT panel includes a plurality of scanning lines and a plurality of common lines formed in one layer and extending in a row direction, and a plurality of signal lines extending in a column direction. A coupling line for coupling the common lines together is disposed outside the pixel array of the TFT panel, such as in a TCP mounted on the TFT panel and mounting thereon a driver IC for driving the scanning lines.

6 Claims, 19 Drawing Sheets

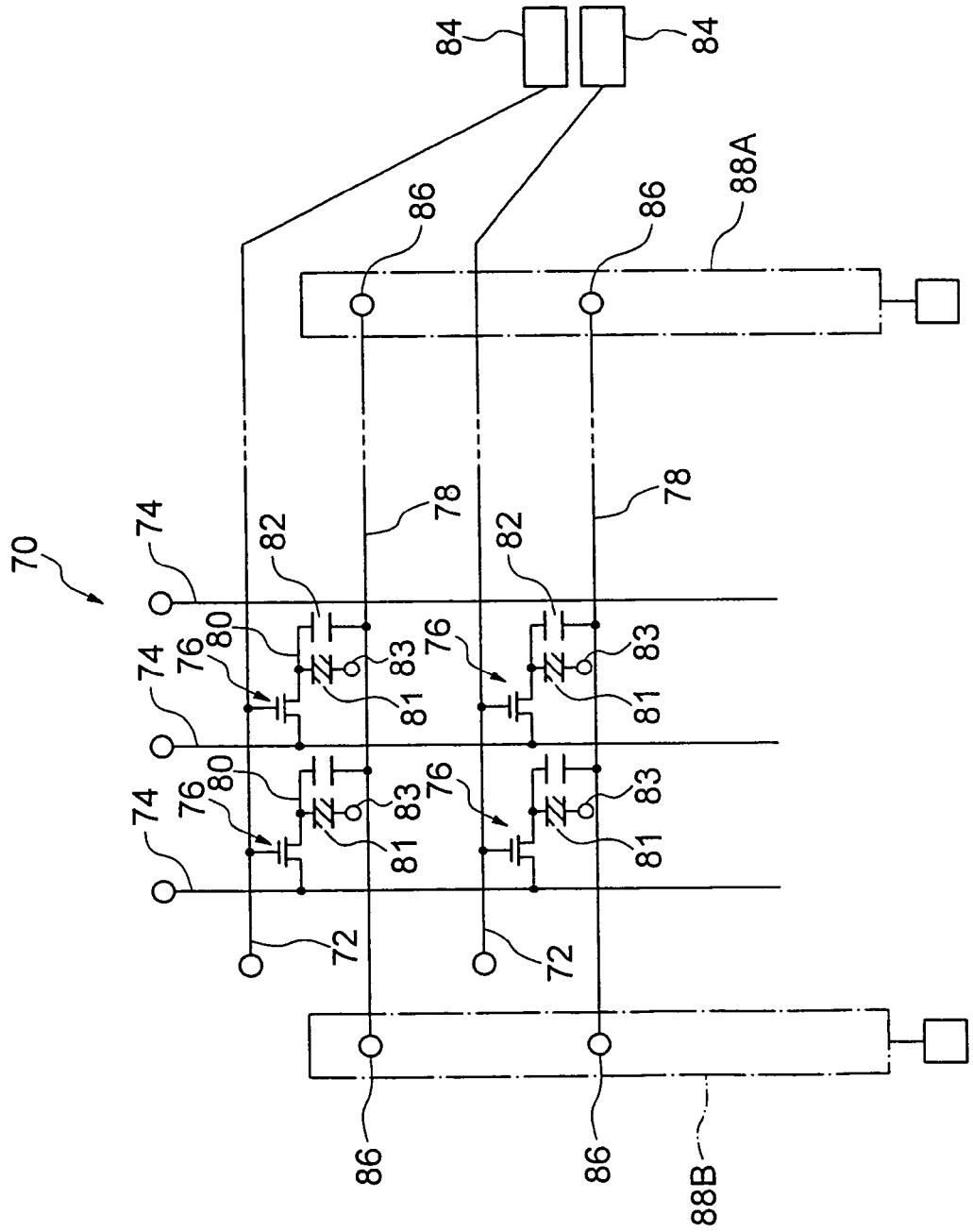

LCD DEVICE HAVING SCANNING LINES AND COMMON LINES

CROSS REFERENCE TO RELATED APPLICATION

The present application is a divisional of application Ser. No. 09/965,566 filed on Sep. 27, 2001, now U.S. Pat. No. 6,930,741.

BACKGROUND OF THE INVENTION (a) Field of the Invention

The present invention relates to a liquid crystal display device having scanning lines and common lines and, more particularly, an LCD device having an improved structure for applying a common potential to common lines extending parallel to scanning lines.

(b) Description of the Related Art

Liquid crystal display (LCD) devices of an active matrix driving mode (referred to as active matrix LCD devices hereinafter) are increasingly used as flat panel display devices for personal computers or television sets. Referring to FIG. 1A, a typical active matrix LCD device, generally designated by numeral 90, includes a TFT panel 92 defining a pixel array thereon and a counter panel 94 opposing the TFT panel 92, and liquid crystal disposed between the TFT panel 92 and the counter panel 94. The LCD device 90 also includes a plurality of vertical driver ICs 96 each mounted on a film tape for driving a plurality of scanning lines in the pixel array, and a plurality of data driver ICs each mounted on a film tape for driving a plurality of signal lines in the pixel array.

A conventional active matrix LCD device is described in Patent Publication JP-A-7-36061, for example. Referring to FIG. 1B, the TFT panel 70 of the conventional active matrix LCD device described therein includes a glass substrate or transparent substrate (not shown), a plurality of scanning lines 72 extending in a row direction on the glass substrate, a plurality of signal lines 74 extending in a column direction on the glass substrate, and an array of pixels disposed at respective intersections between the scanning lines 72 and the signal lines 74. A plurality of common lines 78 each extending parallel to a corresponding one of the scanning lines 72 are also disposed on the glass substrate. A silicon nitride film is interposed between the scanning lines 72 and the signal lines 74 for electric insulation.

Each pixel includes a thin film transistor (TFT) 76 as a switching element, a pixel electrode 80 connected to the source of the TFT 76, an LC element expressed as a capacitor 81 connected between the pixel electrode 80 and a counter electrode 83, and an additional capacitor element 82 connected between the pixel electrode 80 and the common line 78. The gate of the TFT 76 is connected to a corresponding scanning line 72, whereas the drain of the TFT 76 is connected to a corresponding signal line 74.

The proximal end of each scanning line 72 is connected to a scanning terminal 84 which is disposed for connection to a vertical driver IC mounted on a TCP (tape carrier package). Both the ends of each common line 78 is connected via respective through-holes 86 to respective overlying coupling lines 88A and 88B, which is disposed to apply a fixed potential or the ground potential equal to the potential of the counter electrode.

The scanning lines 72 and the common lines 78 are formed by patterning a single conductor layer. Each scanning line 72 intersects an overlying coupling line 88A, with a silicon nitride film interposed therebetween. The steps for forming the overlying coupling lines 88A and 88B and through-holes 86 for connecting the common lines 78 to the overlying coupling lines 88A and 88B complicate the fabrication process for the LCD device in the conventional technique.

SUMMARY OF THE INVENTION

In view of the above, it is an object of the present invention to provide an active matrix LCD device which is capable of reducing the process steps for fabricating the TFT panel by obviating or simplifying the process steps for forming the overlying coupling lines and the through-holes therefor.

The present invention provides, in a first aspect thereof, an active matrix LCD device including a TFT panel, a counter panel and liquid crystal disposed therebetween, the TFT panel including:

a transparent substrate;

a plurality of scanning lines overlying the transparent substrate to extend in a row direction;

a plurality of signal lines overlying the transparent substrate to extend in a column direction;

a plurality of common lines each corresponding to one of the scanning lines to extend in the row direction parallel to the one of the scanning lines, the scanning lines and the common line are formed in a single layer;

an array of pixels each disposed at an intersection between one of the scanning lines and one of the signal lines, the common lines having extending portions extending outside an area for the array of pixels; and a coupling line coupling the extending portions together and formed in the single layer.

The present invention also provides, in a second aspect thereof, a liquid crystal display (LCD) device including a TFT panel, a counter panel and liquid crystal interposed therebetween, the TFT panel including:

a transparent substrate;

a plurality of scanning lines overlying the transparent substrate to extend in a row direction;

a plurality of signal lines overlying the transparent substrate to extend in a column direction;

a plurality of common lines each corresponding to one of the scanning lines to extend in the row direction parallel to the one of the scanning lines, the scanning lines and the common line are formed in a single layer;

an array of pixels each disposed at an intersection between one of the scanning lines and one of the signal lines; and a coupling line extending in the column direction, the coupling line including a conductive paste coupling the common lines together.

The present invention also provides, in a third aspect thereof, a liquid crystal display (LCD) device including a TFT panel, a counter panel, and liquid crystal interposed therebetween, the TFT panel including:

a transparent substrate;

a plurality of scanning lines overlying the transparent substrate to extend in a row direction;

a plurality of signal lines overlying the transparent substrate to extend in a column direction;

a plurality of common lines each corresponding to one of the scanning lines to extend in the row direction parallel to the one of the scanning lines, the scanning lines and the common line are formed in a single layer; and an array of pixels each disposed at an intersection between one of the scanning lines and one of the signal lines, the TFT panel mounting thereon at least one driver block including a film member, a driver IC mounted on the film member for driving the scanning lines, and a coupling line for connecting the common lines together.

In accordance with the active matrix LCD devices of the present invention, since the coupling line for coupling the common lines is disposed outside the area for the pixel array on the TFT panel, at least one photolithographic etching step can be obviated in forming the coupling line, whereby the cost of the LCD device can be reduced.

The above and other objects, features and advantages of the present invention will be more apparent from the following description, referring to the accompanying drawings.

BRIEF DESCRIPTION OF THE DRAWINGS

FIG. 1B is a circuit diagram of a TFT panel of a conventional active matrix LCD device.

PREFERRED EMBODIMENTS OF THE INVENTION

Figure 1A:
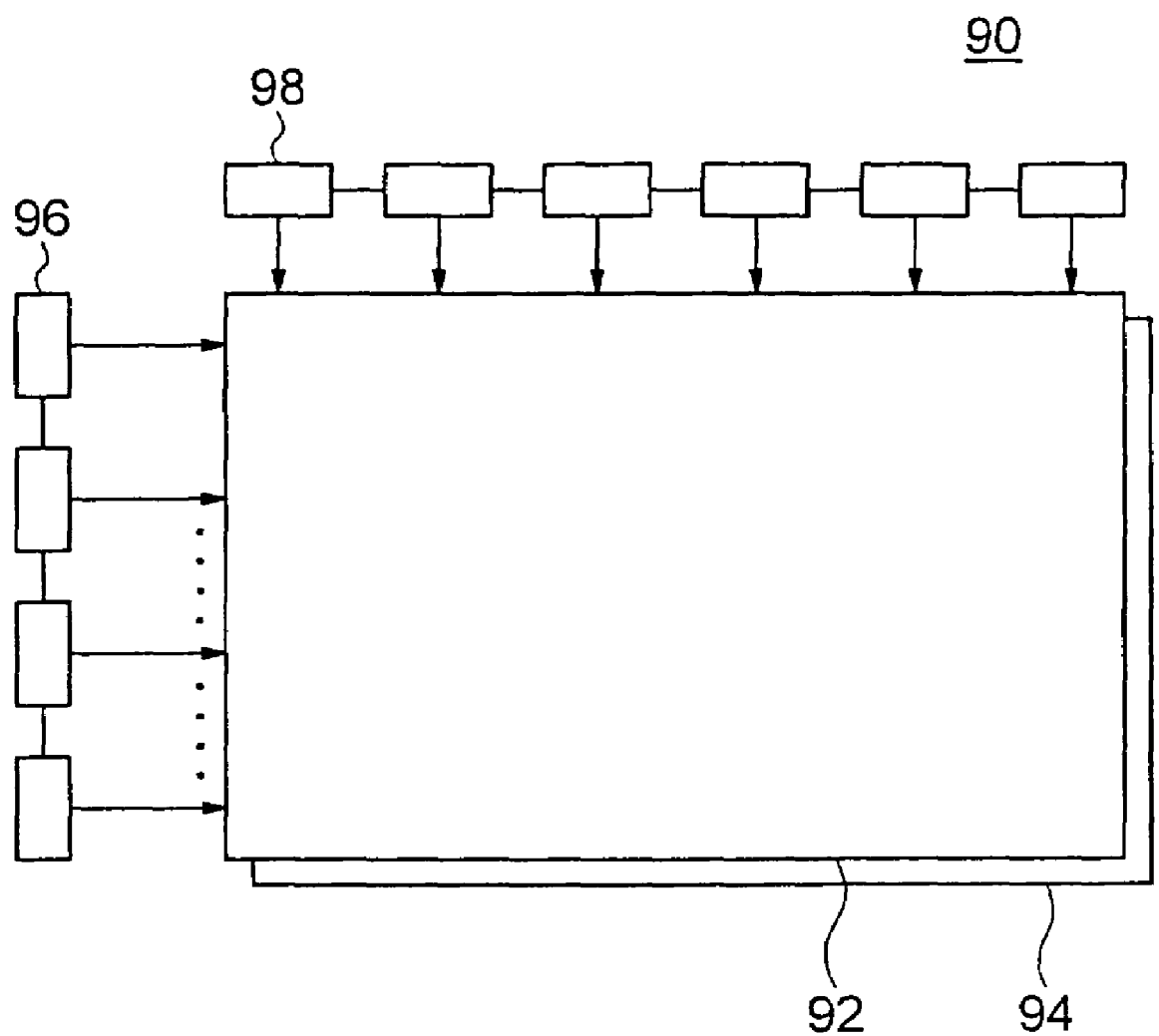
FIG. 1A is a schematic perspective view of a typical active matrix LCD device.

Now, the present invention is more specifically described with reference to accompanying drawings, wherein similar constituent elements are designated by similar reference numerals.

Figure 2:
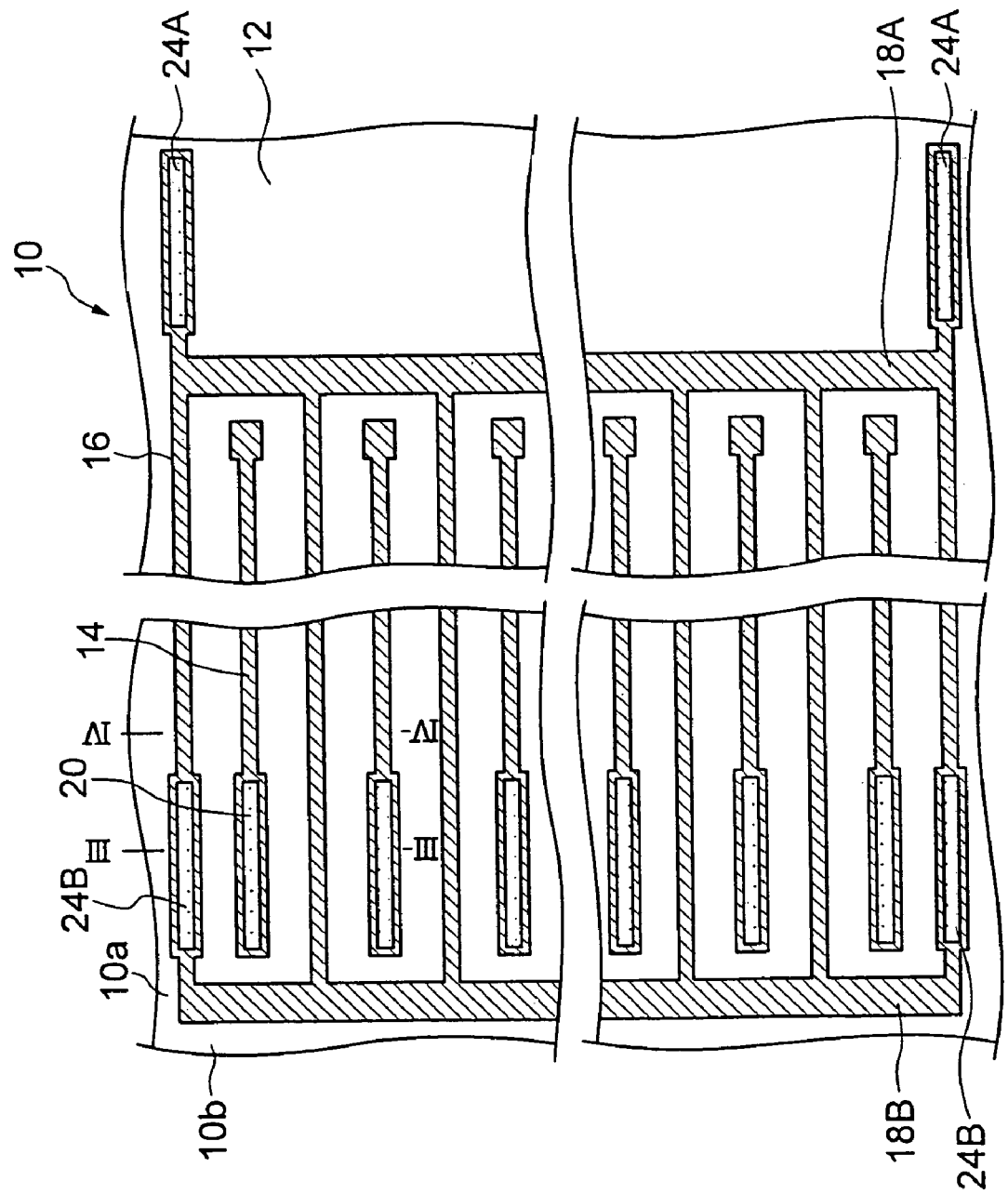
FIG. 2 is a partial top plan view of a TFT panel of an active matrix LCD device according to a first embodiment of the present invention.

Referring to FIG. 2, a TFT panel of an active matrix LCD device, generally designated by numeral 10, according to a first embodiment of the present invention includes a glass substrate 12, a plurality of scanning lines 14 extending in a row direction on the glass substrate 12, a plurality of common lines 16 extending parallel to the scanning lines 14 on the glass substrate 12, a pair of coupling lines 18A and 18B each extending in a column direction for connecting the common lines 16 together at an end of the common lines 16, and a plurality of signal lines (not shown) extending in a column direction. The configuration of the LCD device of the present invention is similar to the conventional LCD device shown in FIGS. 1A and 1B except for the configuration of the coupling lines 18A and 18B for connecting the common lines 16 together and the terminals of the scanning lines 14.

Each scanning line 14 is independently connected to a vertical driver IC through a terminal 20 in the space between the coupling lines 18A and 18B, to apply scanning signals to the gates of a corresponding row of the TFTs. This configuration allows each scanning line 14 not to intersect either of the coupling lines 18A and 18B.

The pair of coupling lines 18A and 18B extend in the peripheral area of the TFT panel, i.e., outside the area for the pixel array. The coupling lines 18A and 18B form a loop circuit in association with the common lines 16 for applying an equi-potential to the common lines 16 substantially without a time difference. The coupling lines 18A and 18B are associated with and connected to a pair of terminals 24A and a pair of terminals 24B, respectively, through which a common potential is applied.

The conductor film including the scanning lines 14, the common lines 16 and the coupling lines 18A and 18 B is formed on the glass substrate 12 and has a two-layer structure including an Al film and an overlying TiN film.

Figure 3:
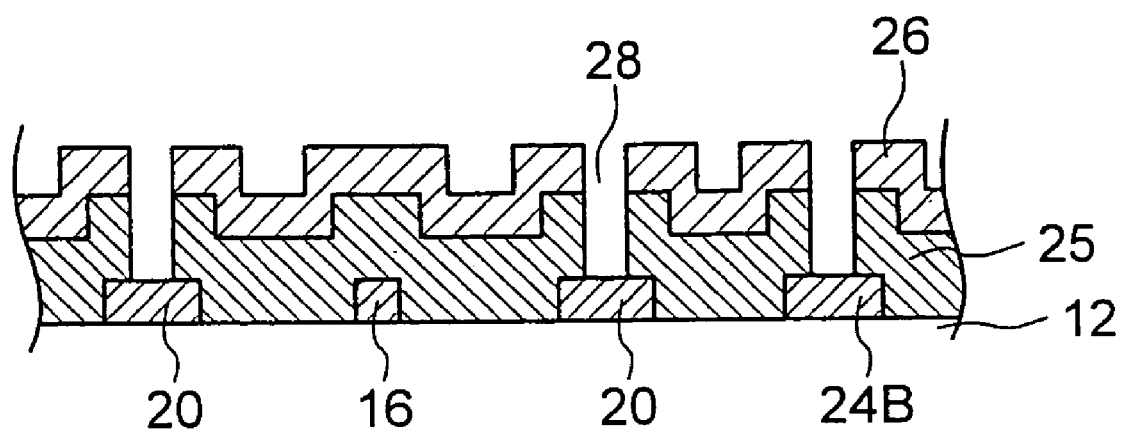
FIG. 3 is a sectional view taken along line III-III in FIG. 2.
Figure 4:
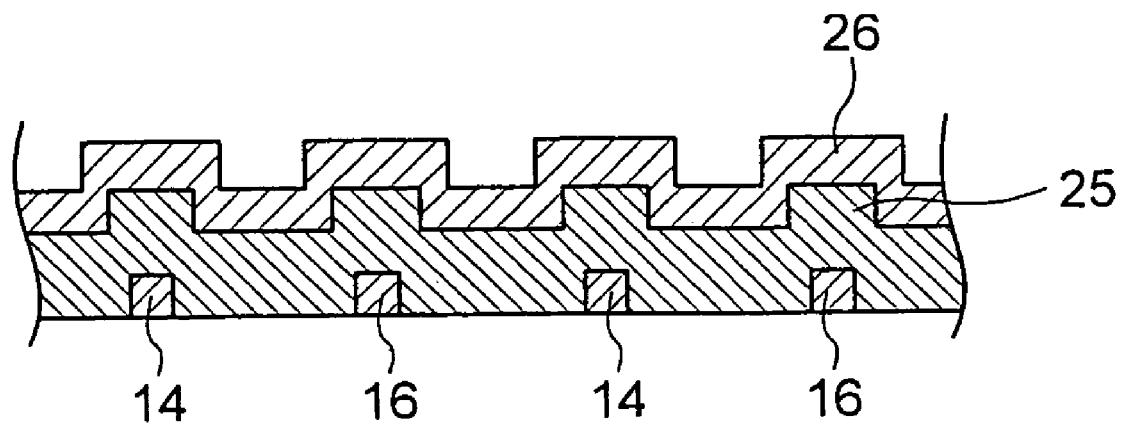
FIG. 4 is a sectional view taken along line IV-IV in FIG. 2.

Referring additionally to FIG. 3, each of the terminals 20, 24A and 24B is formed as a large-width portion of the scanning line 14 or the common line 16, and exposed from the gate insulating film 25 and the passivation film 26 through a through-hole 28. The gate insulating film 25 and the passivation film 26 both made of silicon nitride cover the scanning lines 14 and the common lines 16 in the area other than the terminals 20, 24A and 24B disposed outside the area for the pixel array.

In the above example of the first embodiment, the coupling lines 18A and 18B extend outside the area for the scanning line 14, as described above. Thus, upon separation of the product TFT panels 10 of the present embodiment by scribing the glass substrate 12, the product TFT panels 10 are subjected to cutting along scribe lines extending adjacent to the outer side lines of both the coupling lines 18A and 18B. The portion of the glass substrate separated from the product TFT panel is discarded.

In an alternative of the above embodiment, a single coupling line may be disposed for connecting the common lines together. In this case, a shunt coupling line may be provided extending from the scanning lines 14, the shunt coupling line opposing the single coupling line for the common lines 16 with an intervention of the scanning lines 14. The shunt coupling line is separated from the product TFT panel upon scribing for the product TFT panel.

In the above embodiment, although four terminals are provided for the pair of coupling lines, two or three terminals may suffice the product TFT panel. Further, although an in-plane switching (IPS) mode TFT panel is exemplified in the present embodiment, the present invention can be applied to a twisted-nematic (TN) mode LCD device having a common strage structure.

The structure in which the coupling lines 18A and 18B are formed as a common layer with the common lines 16 allows reduction of the number of the process steps for the LCD device.

Figure 5:
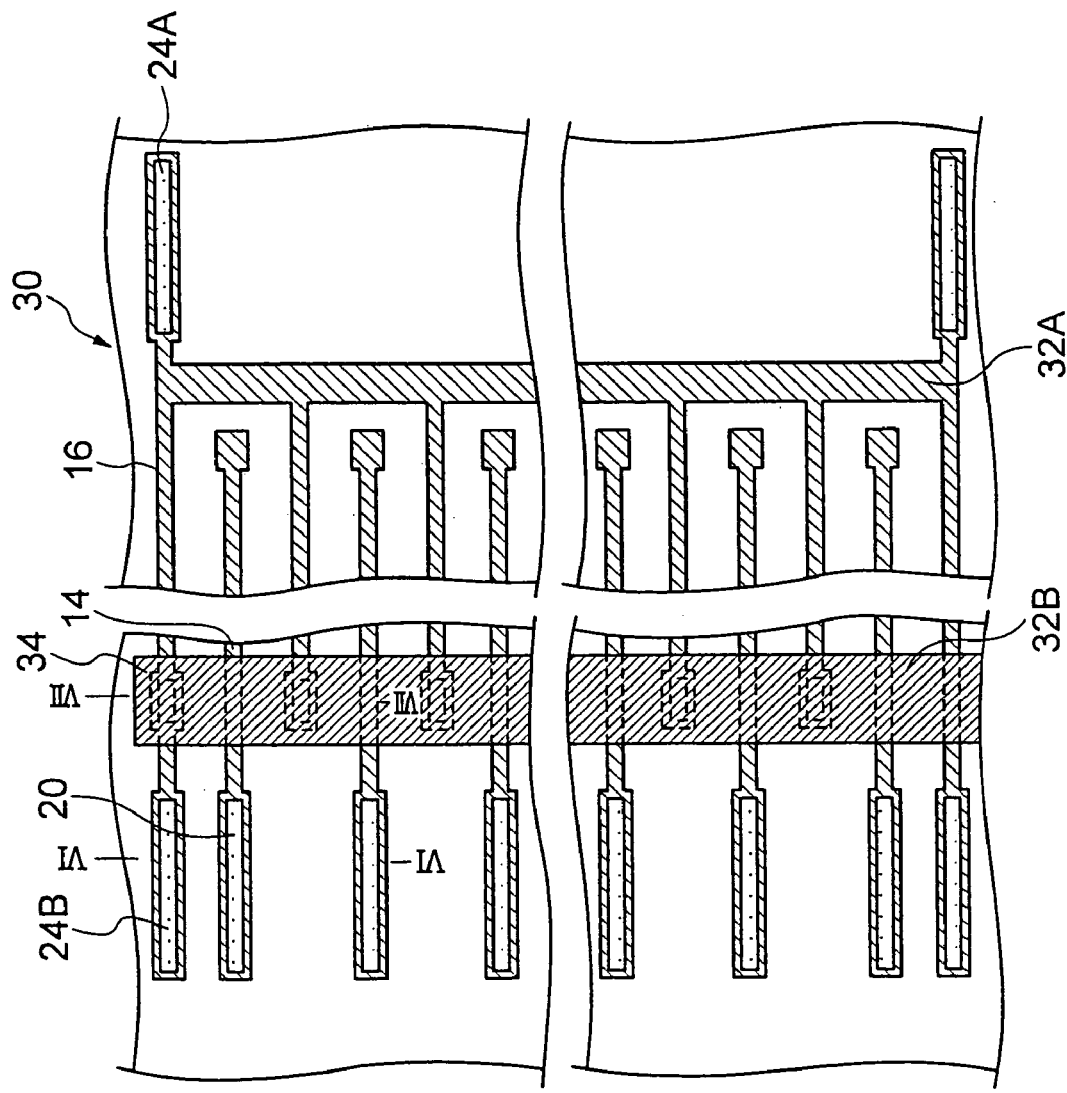
FIG. 5 is a partial top plan view of a TFT panel of an active matrix LCD device according to a second embodiment of the present invention.
Figure 6:
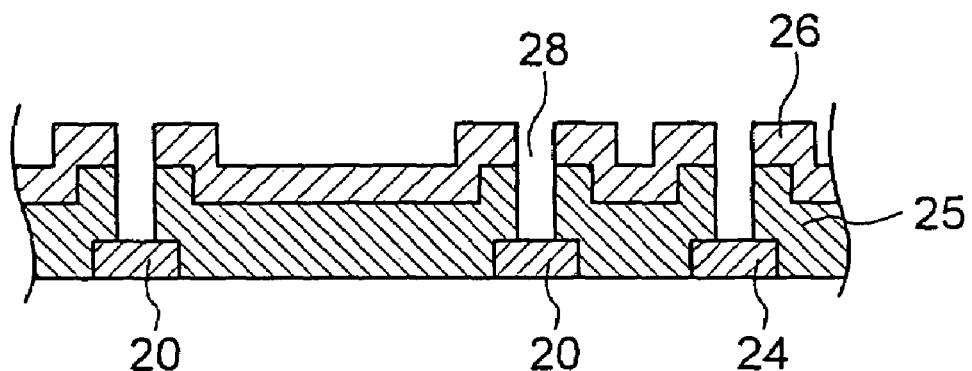
FIG. 6 is a sectional view taken along line VI-VI in FIG. 5.
Figure 7:
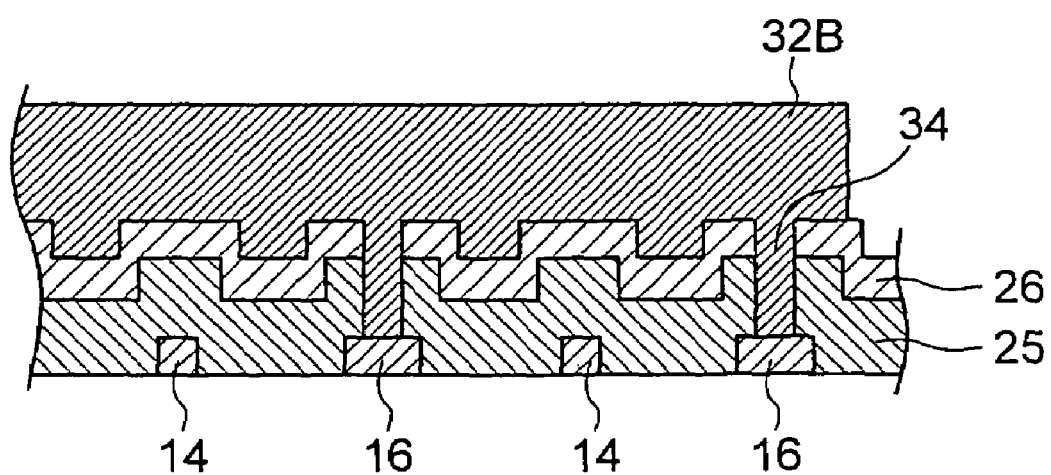
FIG. 7 is a sectional view taken along line VII-VII in FIG. 5.

Referring to FIGS. 5, 6 and 7, a TFT panel of an active matrix LCD device, generally designated by numeral 30, according to a second embodiment of the present invention is similar to the first embodiment except for the configuration of one of the coupling lines and connection between the one of the coupling lines and the common lines. More specifically, a coupling line 32A in the present embodiment is similar to the coupling line 18A in the first embodiment, whereas a coupling line 32B in the present embodiment extends perpendicular to and intersects the scanning lines 14 and the common lines 16 at the area for the pixel array.

The coupling line 32B is made of a conductive tape and is connected to the common lines 16 via the via-plugs in the through-holes 34 penetrating the gate insulation film 25 and the passivation film 26, as shown in FIG. 7. The via-plugs are formed by conductive paste filled in the through-holes. The coupling line 32B is thrust or forced toward the TFT panel for electric connection. The conductive tape is made of "Sintron (trade mark)" supplied from Sinto Paint Co. The coupling line 32B is connected to terminals 24B of the common lines 16 via through-holes 34 and the common lines 16. The conductive tape includes a film member and a conductive layer made of conductive paste (or conductive adhesive) formed thereon.

The terminals 20, 24A and 24B are similar to those in the first embodiment, and as shown in FIG. 6, is formed as large-width portions of the scanning lines 14 and the common lines 16, the large-width portions being exposed from the gate insulating film 25 and the passivation film 26 through through-holes 28.

In the present embodiment, since the coupling line 32B is disposed within the are for the pixel array or the area for the scanning lines 14, the product TFT panels are scribed along a cut line extending along the column of the scanning terminals 20. Although not illustrated in FIG. 5, the scanning lines 14 may be connected to a shunt coupling line disposed outside the scanning terminals 20. In this case, the shunt coupling line is separated from the product TFT panel upon scribing.

In the present embodiment, the structure wherein the coupling line 32A and the common lines 16 are formed by patterning a single conductor layer, and wherein the coupling line 32B is formed by thrusting the conductive tape allows the number of process steps such as photolithographic and patterning steps to be reduced.

Figure 8:
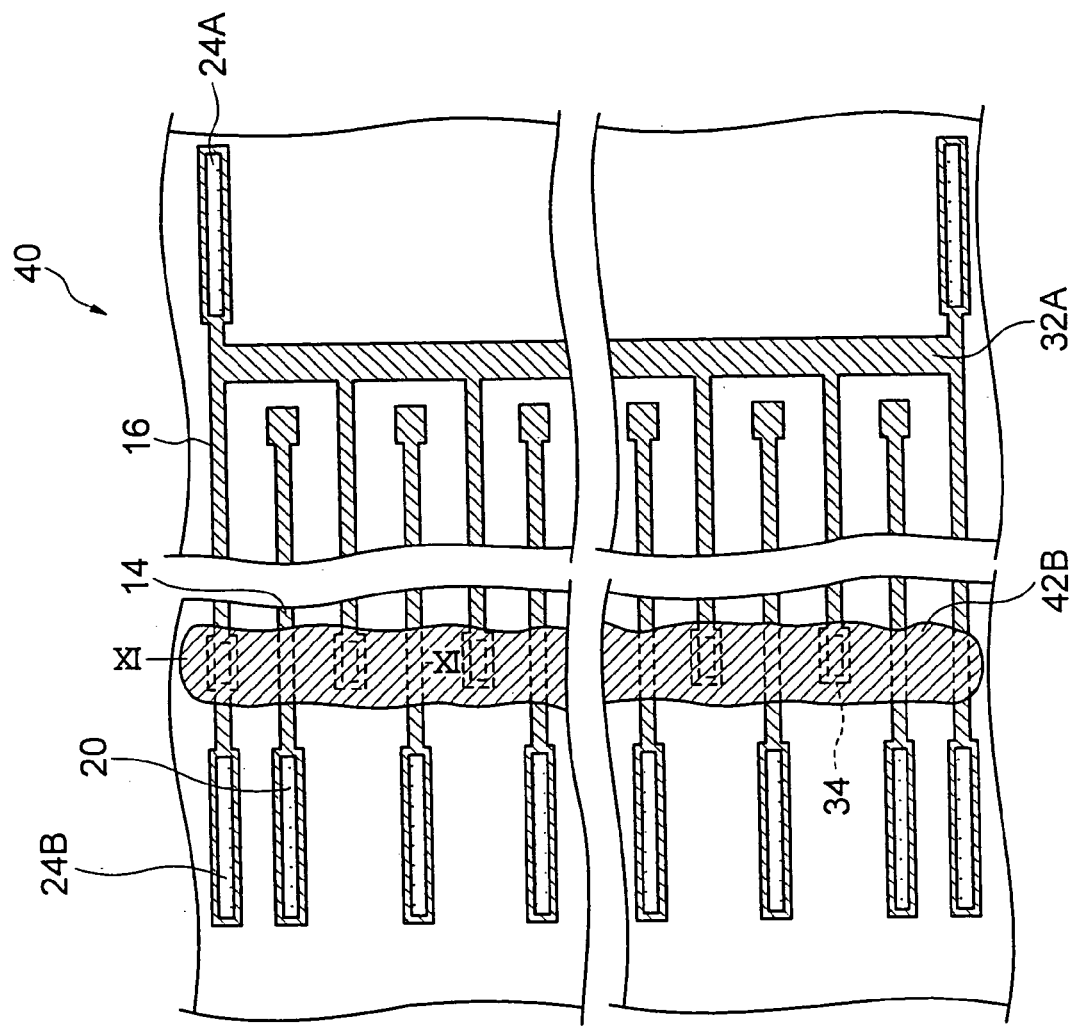
FIG. 8 is a partial top plan view of a TFT panel of an active matrix LCD device according to a third embodiment of the present invention.
Figure 9:
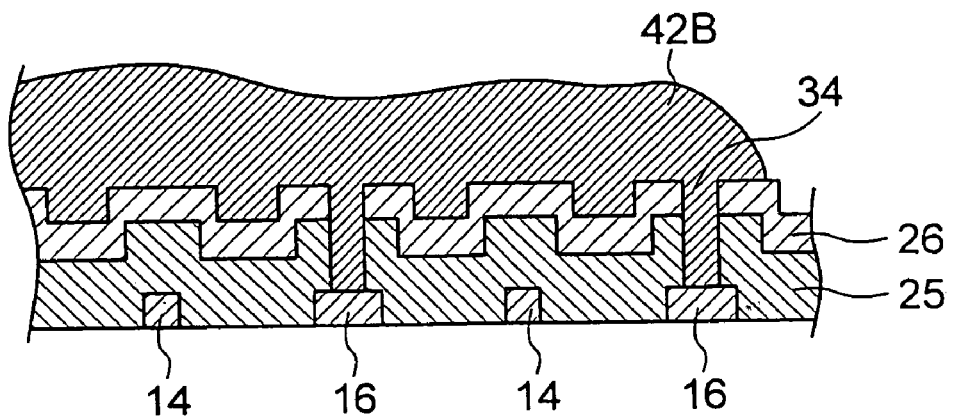
FIG. 9 is a sectional view taken along line IX-IX in FIG. 8.

Referring to FIGS. 8 and 9, a TFT panel of an active matrix LCD device, generally designated by numeral 40, according to a third embodiment of the present invention is similar to the second embodiment except for the configuration of the coupling line 42B. More specifically, the coupling line 42B in the present embodiment is made of silver (Ag) paste, which is electrically connected to the underlying common lines 16 via through-holes 34 penetrating the gate insulating film 25 and the passivation film 26.

The silver paste is made of evaporating paste mixed with silver particles to have electric conductivity. The silver paste is coated on the passivation film while filling the through-holes, heated for solidification to form a solid electric conductor. The silver paste may be H20E (trade mark) supplied from Epotech Co.

Figure 10:
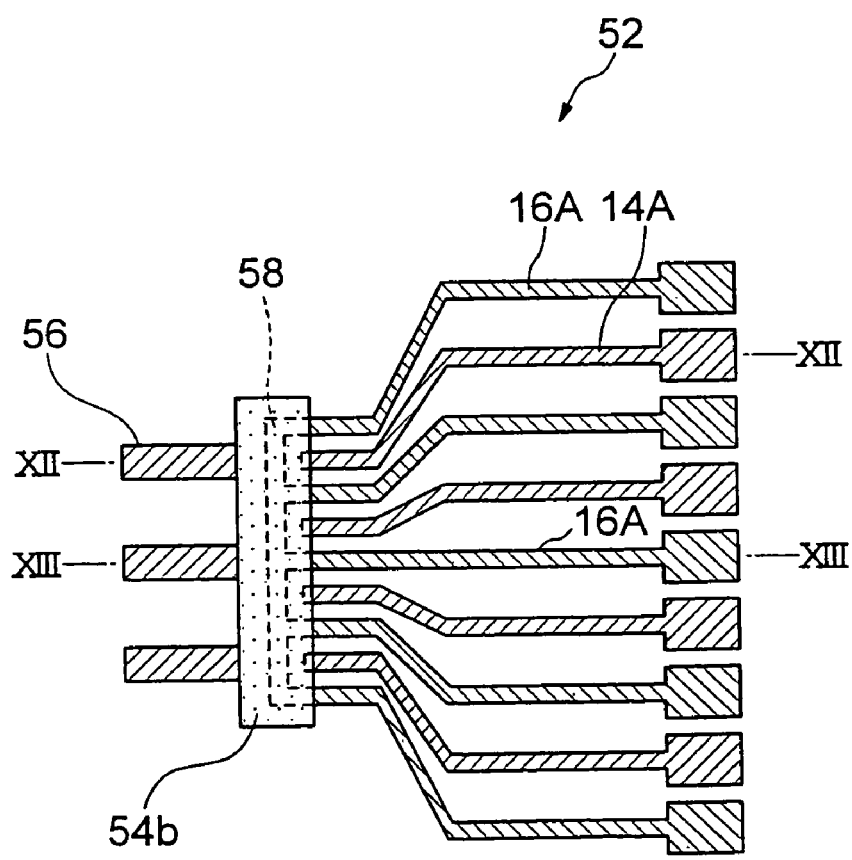
FIG. 10 is a partial top plan view of a TFT panel of an active matrix LCD device according to a fourth embodiment of the present invention.

Referring to FIG. 10, in the terminal area of a TFT panel of an active matrix LCD device, generally designated by numeral 10, according to a fourth embodiment of the present invention, a plurality of scanning lines (not shown) are connected to respective scanning electrodes 14A formed on a driver block or a COF (chip-on-film) 54, and then connected to a vertical driver IC 54b. In addition, the common lines (not shown) are connected to common electrodes 16A formed on the COF 54, and are connected together via a coupling line 58 formed on a base film mounting thereon the vertical driver IC 54b. The present embodiment is similar to the second embodiment, except for the coupling line 58 formed on the COF in the present embodiment.

Figure 11:
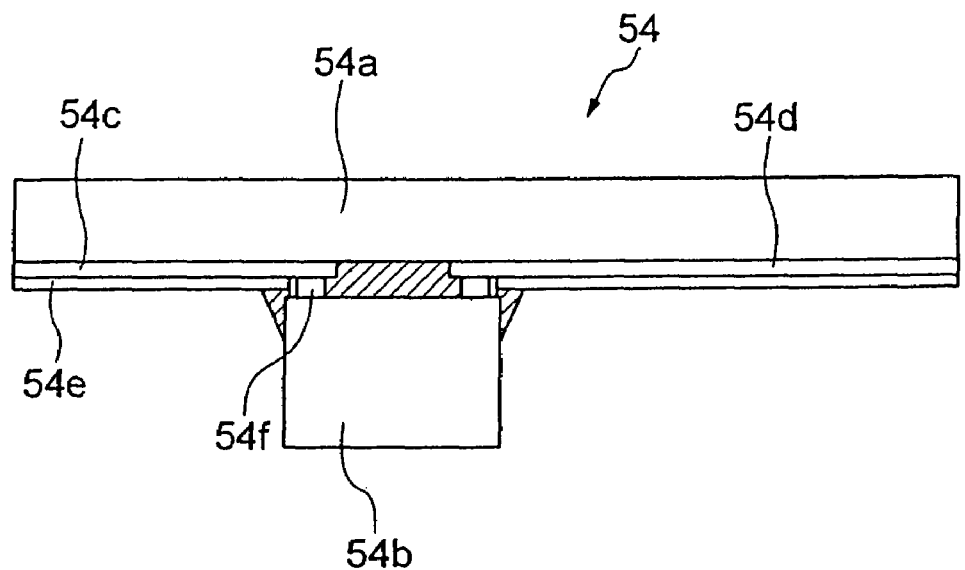
FIG. 11 is a sectional view showing a COF used for the TFT panel of FIG. 10.

The structure of a typical COF 54 is exemplified in FIG. 11. The COF 54 includes a base film 54a, a vertical driver IC 54 mounted on the base film 54a for driving the scanning lines, a plurality of input lines 54c connected to respective input terminals of the vertical driver IC 54b, and a plurality of output lines 54d connected to respective output terminals of the vertical driver IC 54b.

The output lines 54d correspond to the scanning electrodes 14A shown in FIG. 10. A solder resist film 54e covers the input and output lines 54c and 54d on the base film 54a, and a plurality of bumps 54f connect the vertical driver IC 54b and the input and output lines 54e and 54d. The COF 54 may be such as supplied from Sony Chemical Corp.

Figure 12:
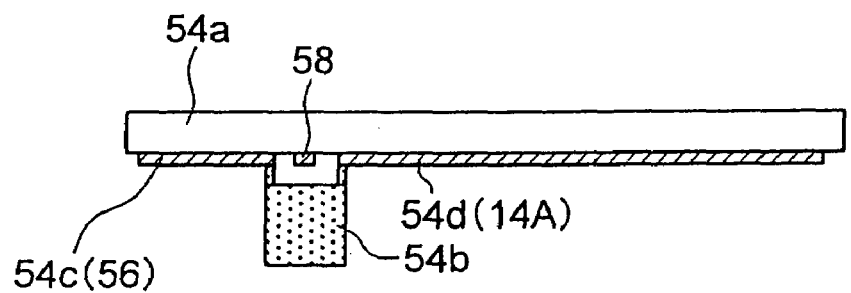
FIG. 12 is a sectional view taken along line XII-XII in FIG. 10.
Figure 13:
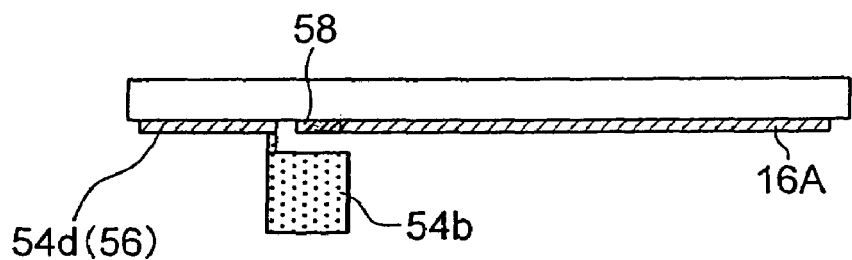
FIG. 13 is a sectional view taken along line XIII-XIII in FIG. 10.

Referring additionally to FIGS. 12 and 13, the scanning lines 14 are connected to the vertical driver IC 54b via the scanning electrodes 14A, i.e., output lines 54d, formed on the COF 54. In addition, the common lines 16 are connected together by the coupling line 58 via the common electrodes 16A formed on the COF 54. The coupling line 58 is formed on the base film 54a, as shown in FIG. 12, within a space between the vertical driver IC 54b and the base film 54a and between the input terminals and the output terminals of the vertical driver IC 54. In this configuration, the COF 54 does not have an opening, such as formed in a TCP which is describe later, and the coupling line 58 is formed in the space above the vertical driver IC 54b.

Figure 14:
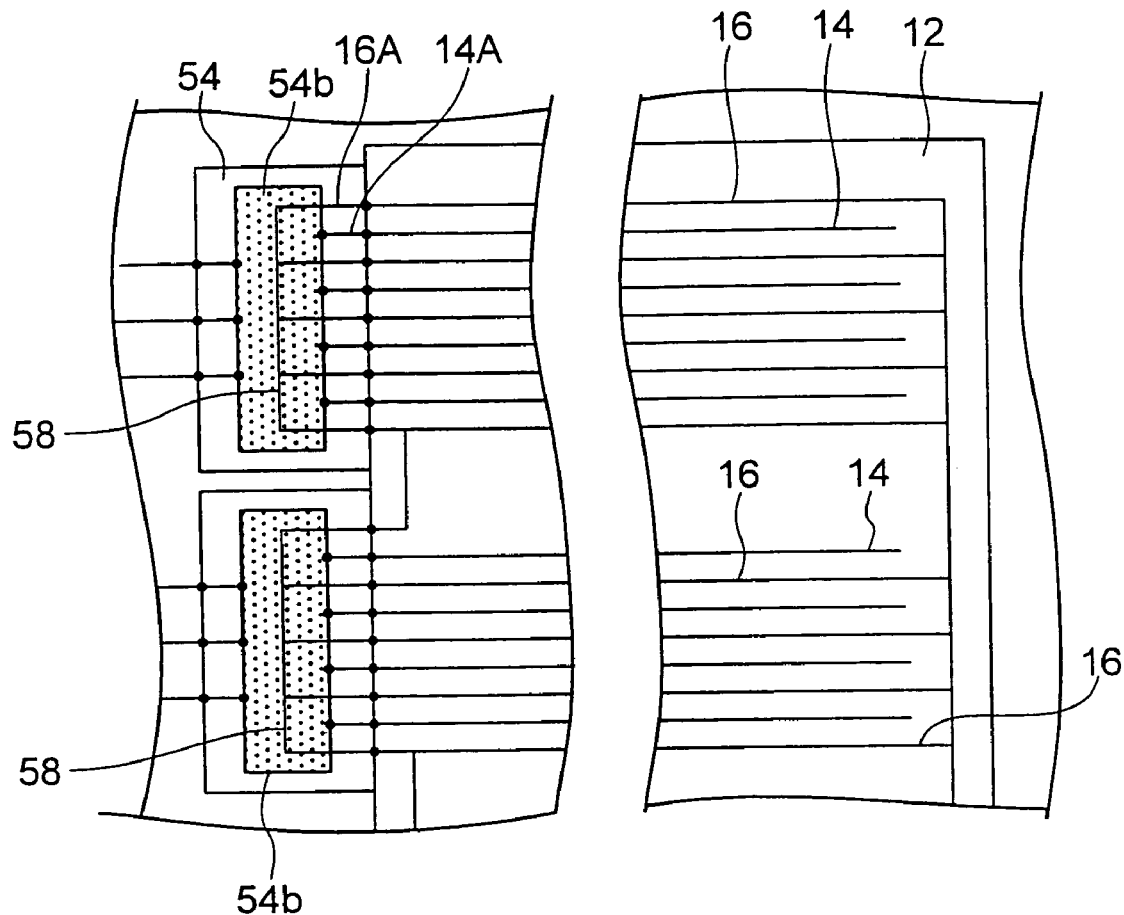
FIG. 14 is a schematic circuit diagram showing the connection for the COF shown in FIG. 11.

In the above embodiment, the output lines 54d of the COF 54, which mounts thereon the scanning electrodes 14A, the common electrodes 16A, and the coupling line 58, is attached to the end terminals of the scanning lines 14 and the common lines 16 by thrusting the COF 54 toward the glass substrate 12. FIG. 14 shows the final structure of connection especially in the vicinity of the COF 54, wherein the coupling line 58 extends between the row of the output terminals and the row of input terminals of the vertical driver IC 54b. Thus, the active matrix LCD device of the present embodiment enables the number of photolithographic patterning steps to be reduced by obviating formation of the coupling line overlying the common lines 16 and the scanning lines 14.

Figure 15:
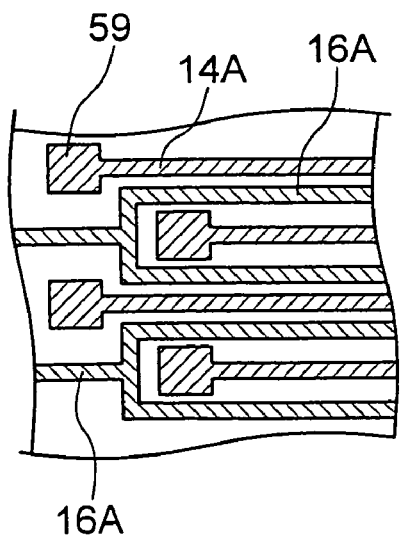
FIG. 15 is a partial top plan view of a modification of the TFT panel of FIG. 10.

Referring to FIG. 15, a modification of the active matrix LCD device of FIG. 7 is such that the terminals 59 of the scanning electrodes 14A are arranged in a zig-zag fashion. This arrangement of the terminals 59 of the scanning electrodes 14A allows the common electrodes 16A to pass in a crank space formed between adjacent scanning electrodes 14A. In this case, the vertical driver IC 54b has an arrangement of bumps corresponding to the arrangement of the terminals 59 shown in FIG. 15.

Figure 16:
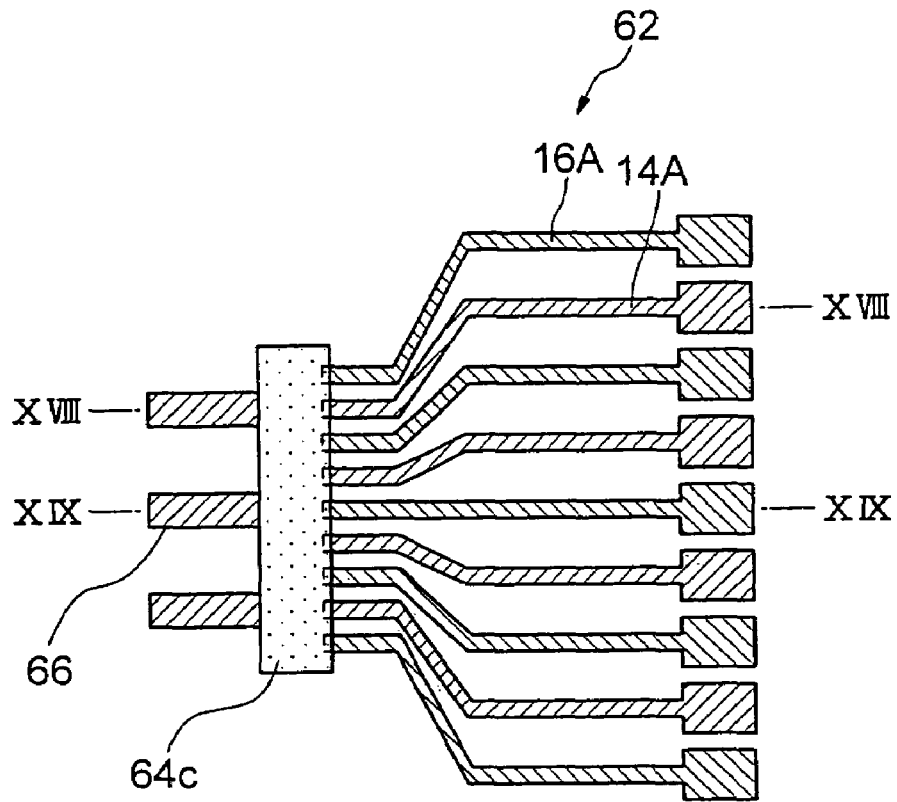
FIG. 16 is a partial top plan view of a TFT panel of an active matrix LCD device according to a fifth embodiment of the present invention.

Referring to FIG. 16, the contact area of a TFT panel of an active matrix LCD device, generally designated by numeral 62, according to a fifth embodiment of the present invention is similar to the second embodiment of FIG. 5 except for a coupling line installed within the vertical driver IC 54 in the present embodiment. More specifically, the scanning lines 14 such as shown in FIG. 5 are connected to scanning electrodes 14A formed on a driver block or a TCP 64, and then connected to a vertical driver IC 64c mounted on the TCP 64. The common electrodes 16A formed within the TCP 64 are connected to the inner common electrodes formed inside the vertical driver IC 64c and connected together via an inner coupling line formed inside the vertical driver IC 64c.

Figure 17:
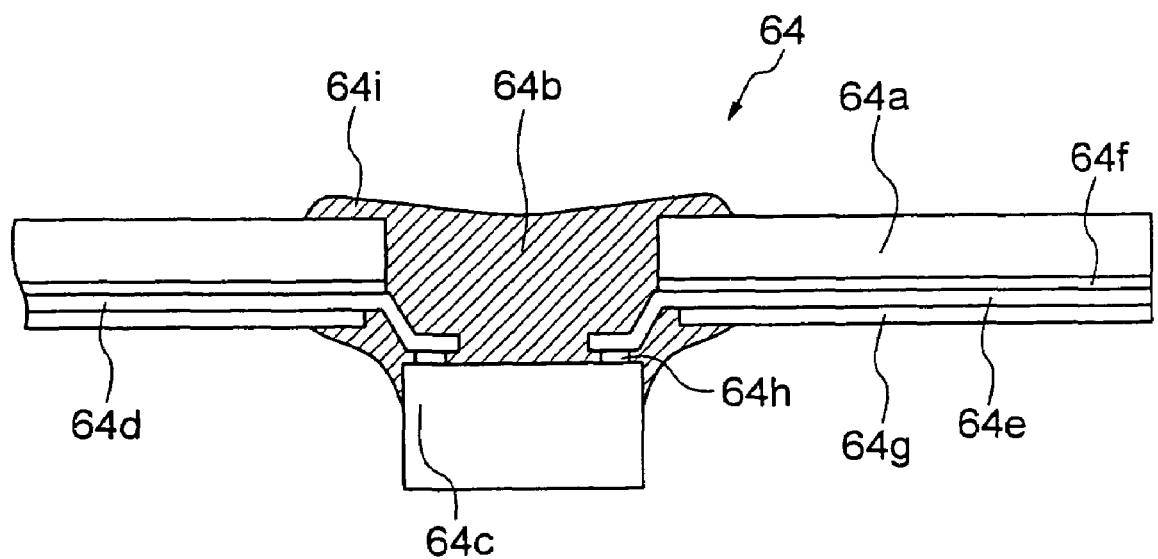
FIG. 17 is a sectional view of a TCP used in the TFT panel of FIG. 16.

A typical TCP 64 having an opening is exemplified in FIG. 17, wherein a vertical driver IC 64c is attached to the base film 64a by a resin 64i at the opening 64b formed in the base film 64a. The base film 64a has thereon input lines 64d for the vertical driver IC 64c, and output lines 64e for the vertical driver IC 64c. The input and output lines 64d and 64e are adhered onto the base film 64a by an adhesive 64f, and covered by a solder resist layer 64g. The input and output lines 64d and 64e are connected to the vertical driver IC 64c via bumps 64h. The TCP 64 may be such that supplied from NEC Corp.

Figure 18:
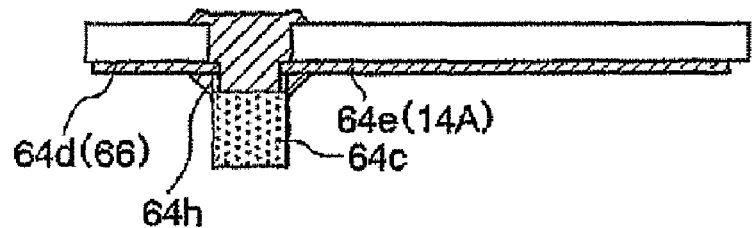
FIG. 18 is a sectional view taken along line XVIII-XVIII in FIG. 16.
Figure 19:
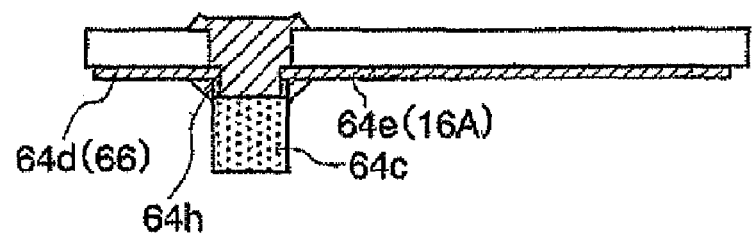
FIG. 19 is a sectional view taken along line XIX-XIX in FIG. 16.

In the present embodiment, as shown in FIGS. 18 and 19, the scanning electrodes 14A and the common electrodes 16A are connected to the vertical driver IC 64c via the bumps 64h. The common electrodes 16A are connected together by the inner coupling line installed inside the vertical driver IC 64c, whereas the scanning electrodes 14A is applied with a gate signal from the input lines 64d by the control of the vertical driver IC 64c.

Figure 20:
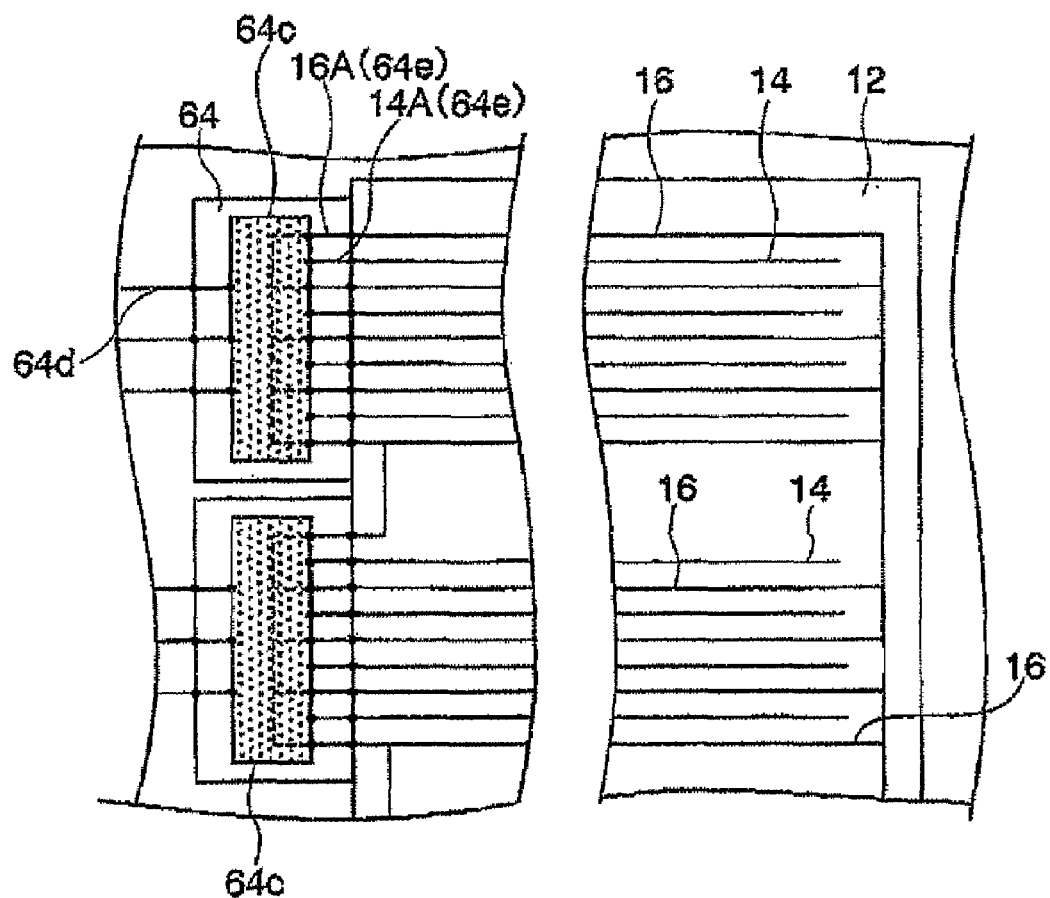
FIG. 20 is schematic circuit diagram showing the connection for the TCP shown in FIG. 17.

The output lines 64e of the TCP 64 including therein the vertical driver IC 64c, scanning electrodes 14A and the common electrodes 16A are attached to the end terminals of the scanning lines 14 and the common lines 16 by thrusting the TCP 64 toward the glass panel 12 for electric connection. The TCP 64 may be replaced by a COF such as 54 used in the fourth embodiment. FIG. 20 shows the connection especially in the vicinity of the TCP 64.

Figure 21:
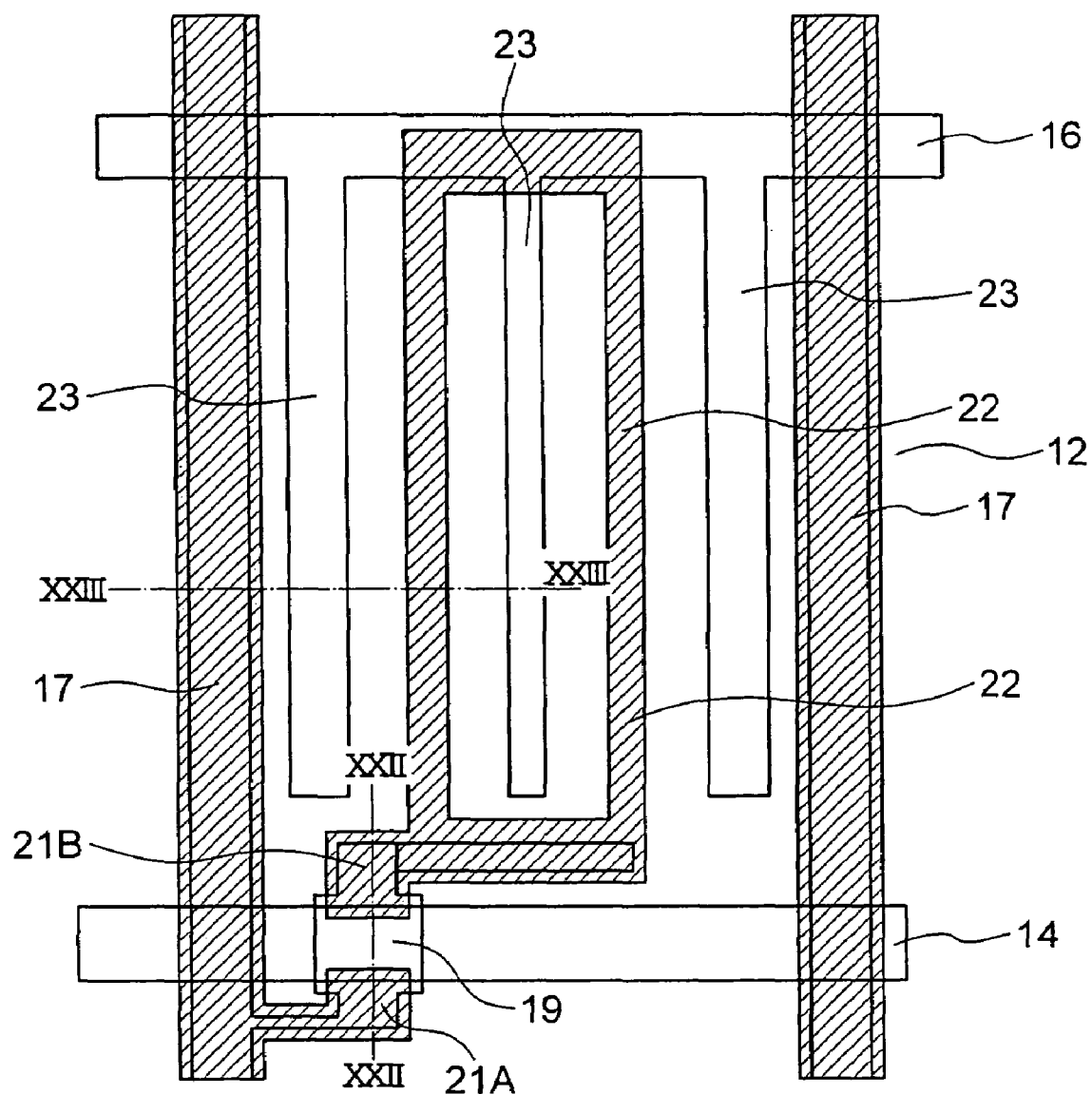
FIG. 21 is a top plan view of the pixel in the TFT panel of FIG. 2.
Figure 22:
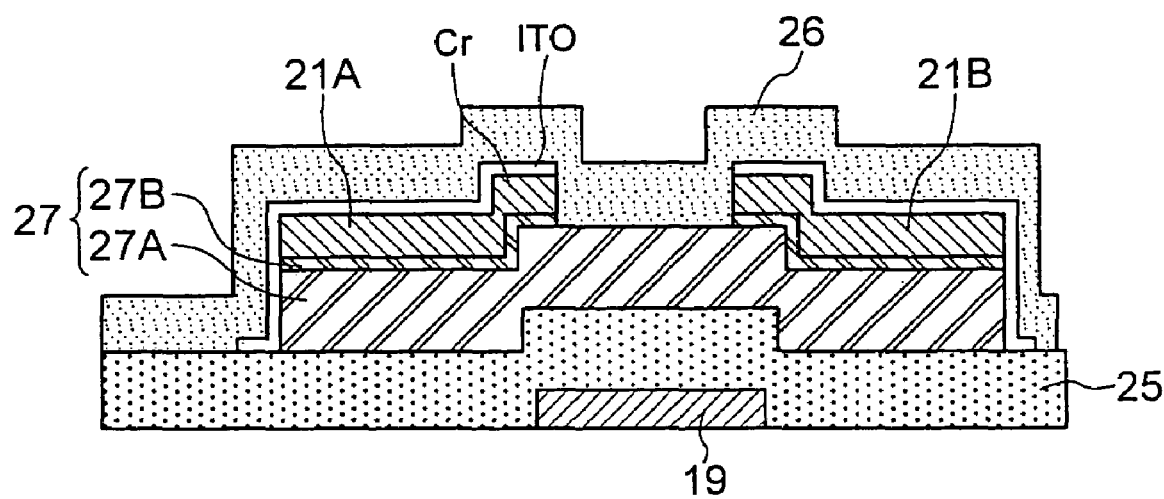
FIG. 22 is a sectional view taken along line XXII-XXII in FIG. 21.

Referring to FIG. 21, a pixel of the TFT panel shown in FIG. 2 is disposed in the area defined by a scanning line 14, a corresponding common line 16 and adjacent two signal lines 17. The pixel includes a TFT having a gate electrode 19 implemented by a portion of the scanning line 14. Referring additionally to FIG. 22, the TFT, known as an inverted stagger TFT, has a semiconductor layer 27 including an island amorphous silicon film 27A to which the gate electrode 19 opposes with an intervention of an underlying gate insulating film 25, and a pair of n-type source/drain regions made of amorphous silicon films 27B formed on the island amorphous silicon film 27A. A source electrode 21B and drain electrode 21A are formed on the respective n-type source/drain regions.

Figure 23:
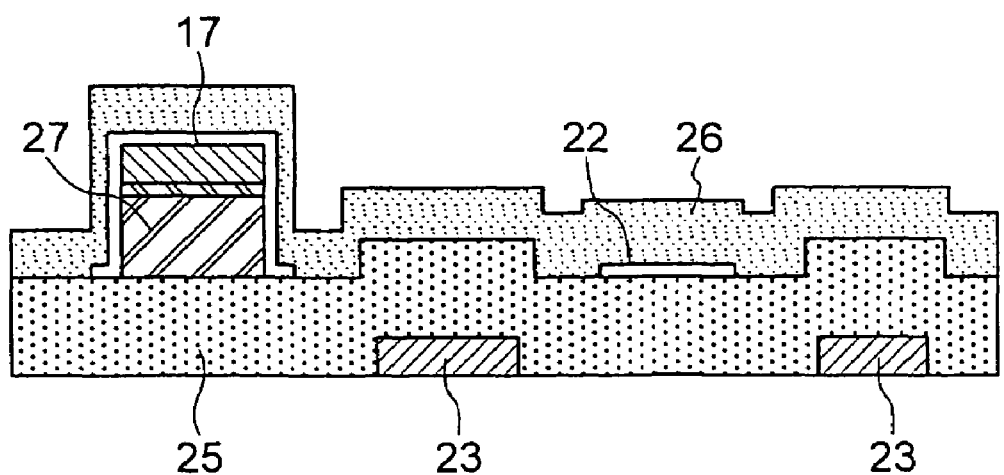
FIG. 23 is a sectional view taken along line XXIII-XXIII in FIG. 21.

A comb-shape pixel electrode 22 and a comb-shape common electrode 23 shown in FIG. 21 oppose each other in the pixel, with an intervention of the gate insulating film 25, as shown in FIG. 23. The pixel electrode 22 and the common electrode 23 form therebetween a lateral electric field parallel to the glass substrate 12, thereby implementing an in-plane switching (IPS) mode LCD device.

The scanning line 14, common line 16, common electrode 23 and gate electrode 19 are formed by patterning a first level conductor layer including an Al film and an overlying TiN film. The signal line 17, drain electrode 21A, source electrode 21B are formed by patterning a second level conductor layer including a Cr film and an overlying transparent ITO film. The signal line 17 is formed on an underlying semiconductor layer 27 which is configured to have the same pattern as the signal line 17 and formed on the gate insulating film 25. The pixel electrode 22 is made of the transparent ITO film, which extends to oppose the common line 16 with an intervention of the gate insulating film 25, to thereby form an additional capacitor therebetween for assisting the LC element to store signal charge.

Now, a fabrication process for fabricating the active LCD device of the first embodiment will be described with reference to FIGS. 24A to 24K.

Figure 24A:
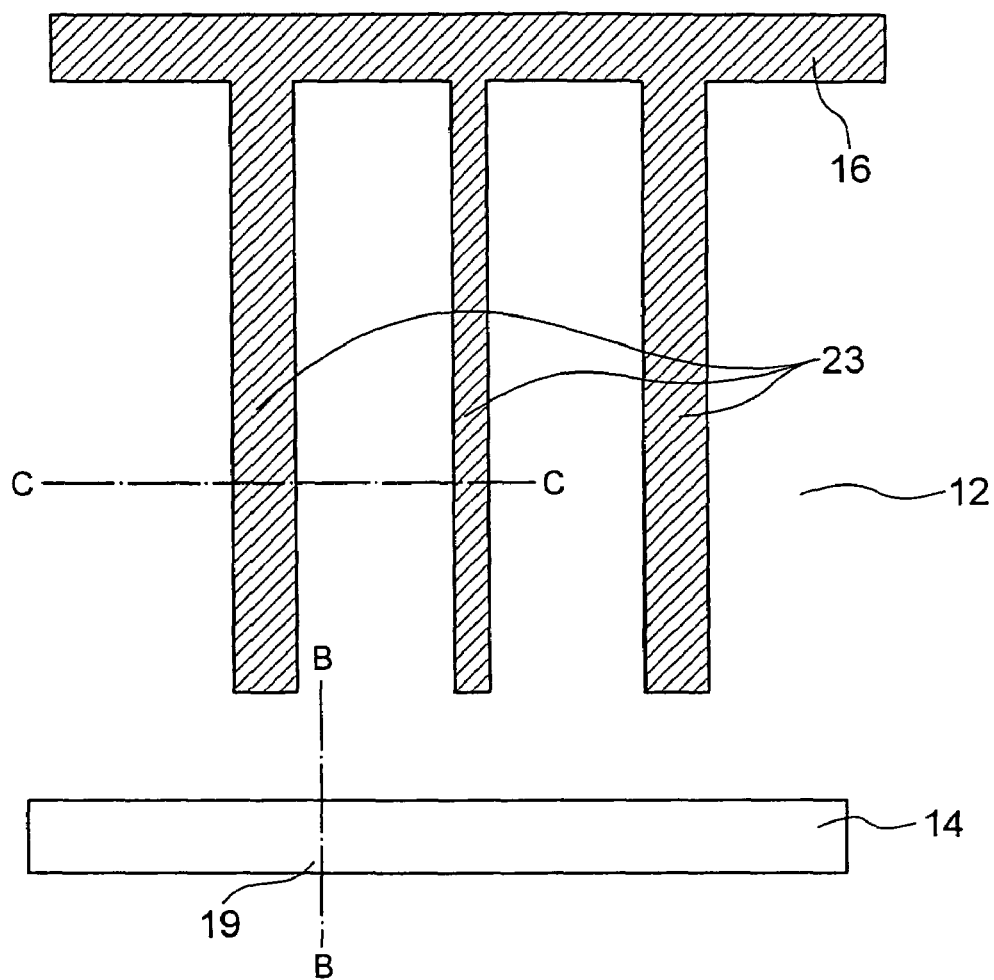
FIG. 24A is a top plan view of the TFT panel of FIG. 2 at a first step of fabrication thereof.
Figure 24B:
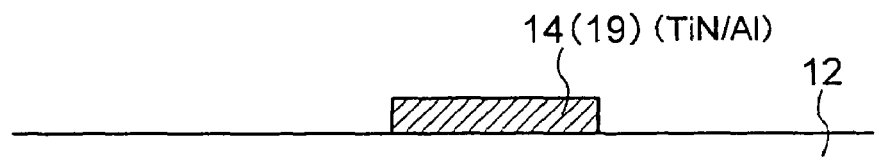
FIG. 24B is a sectional view taken along line B-B in FIG. 24A.
Figure 24C:
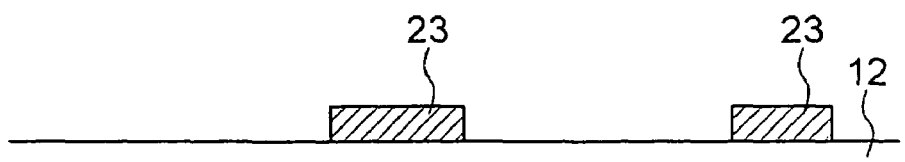
FIG. 24C is a sectional view taken along line C-C in FIG. 24A.

An Al film having a thickness of about 200 nm and a TiN film having a thickness of about 500 nm are consecutively formed on a glass substrate 12 by sputtering, thereby forming a first level conductor film. The first level conductor film is then patterned by a photolithographic etching step to obtain: scanning lines 14 including scanning terminals 20 and gate electrodes 19; common lines 16 including common electrodes 23; and coupling lines 18 including common terminals 24A and 24B. The resultant TFT panel after the etching is shown in FIGS. 24A to 24C.

Figure 24D:
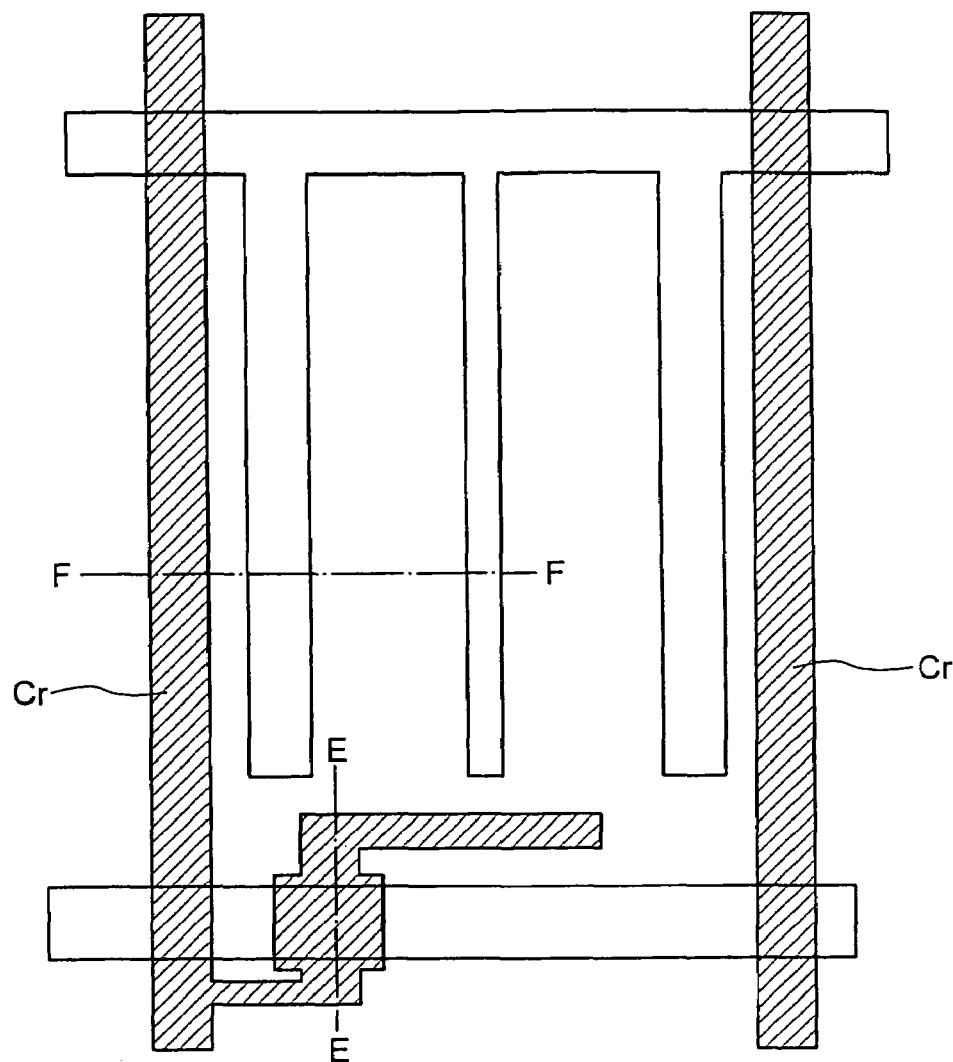
FIG. 24D is a top plan view of the TFT panel of FIG. 2 at a second step of fabrication thereof.
Figure 24E:
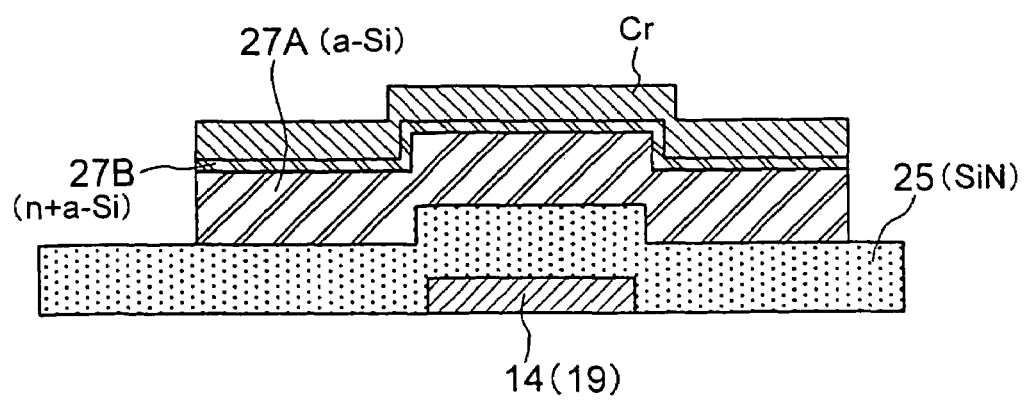
FIG. 24E is a sectional view taken along line E-E in FIG. 24D.
Figure 24F:
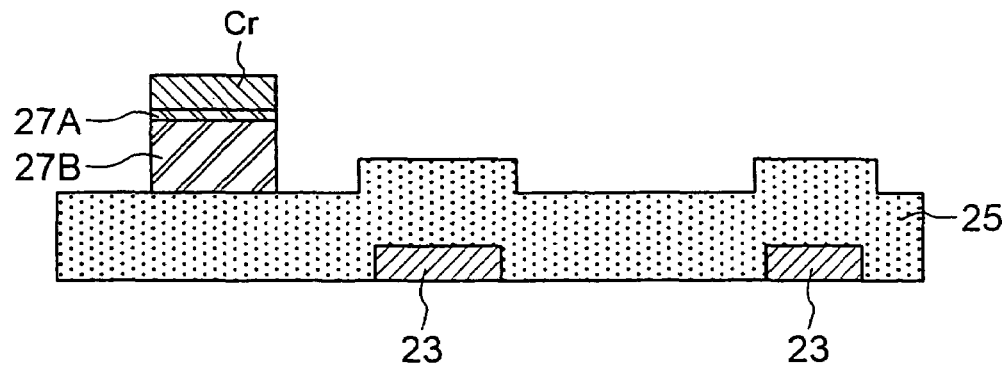
FIG. 24F is a sectional view taken along line F-F in FIG. 24D.

Thereafter, a gate insulating film 25 made of silicon nitride having a thickness of about 400 nm, a semiconductor layer 27 including an amorphous silicon film 27A having a thickness of 250 nm and an n-type amorphous silicon film 27B having a thickness of 50 nm are consecutively formed on the surface of the resultant TFT panel by a plasma-enhanced CVD process. A metallic film made of Cr having a thickness of 250 nm is then formed thereon by sputtering. The semiconductor layer and the metallic film are then consecutively patterned to obtain signal lines 17 including signal terminals and interconnects extending from the signal lines in the pixels. The resultant TFT panel after the etching is shown in FIGS. 24D to 24F.

Figure 24G:
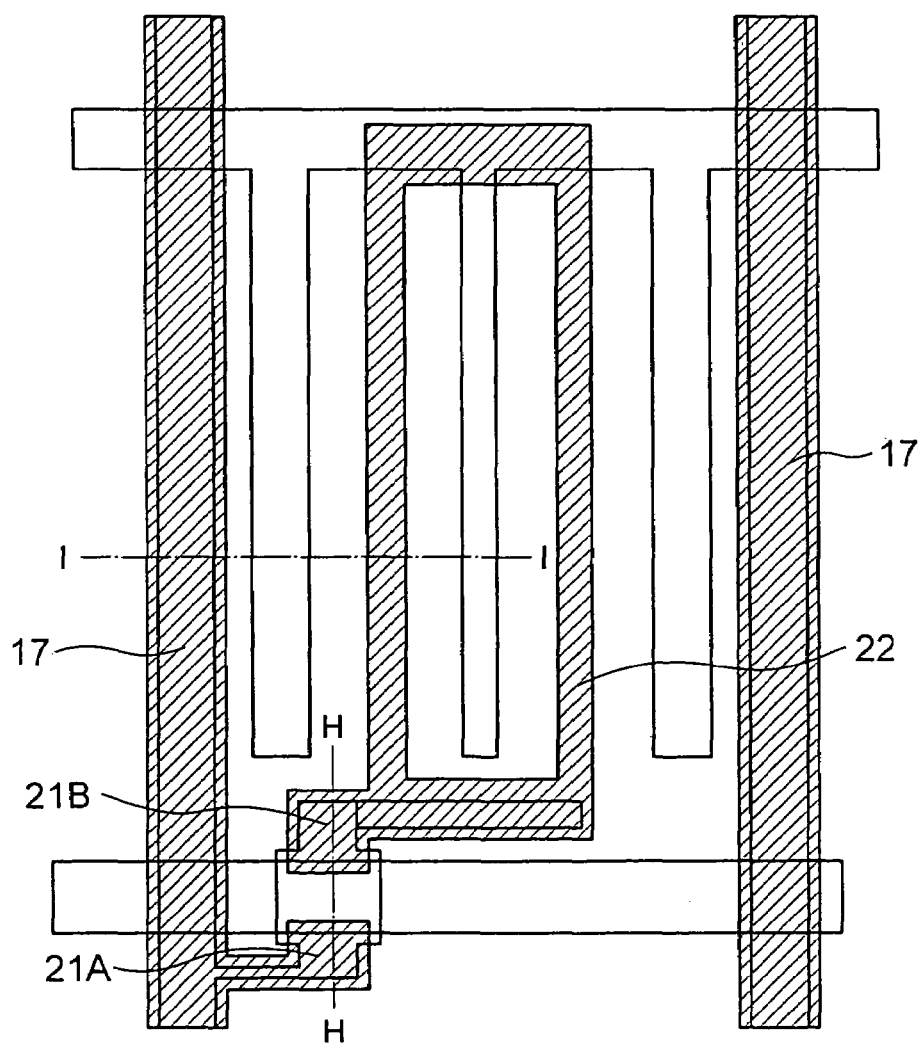
FIG. 24G is a top plan view of the TFT panel of FIG. 2 at a third step of fabrication thereof.
Figure 24H:
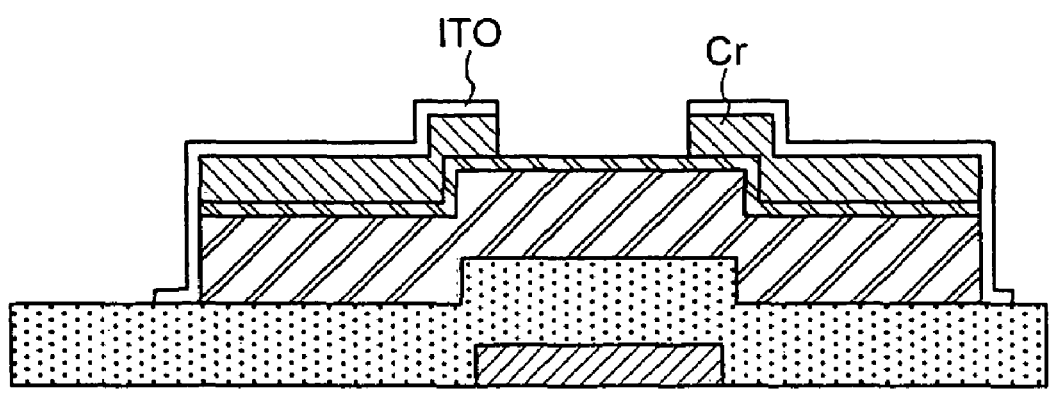
FIG. 24H is a sectional view taken along line H-H FIG. 24G.
Figure 24I:
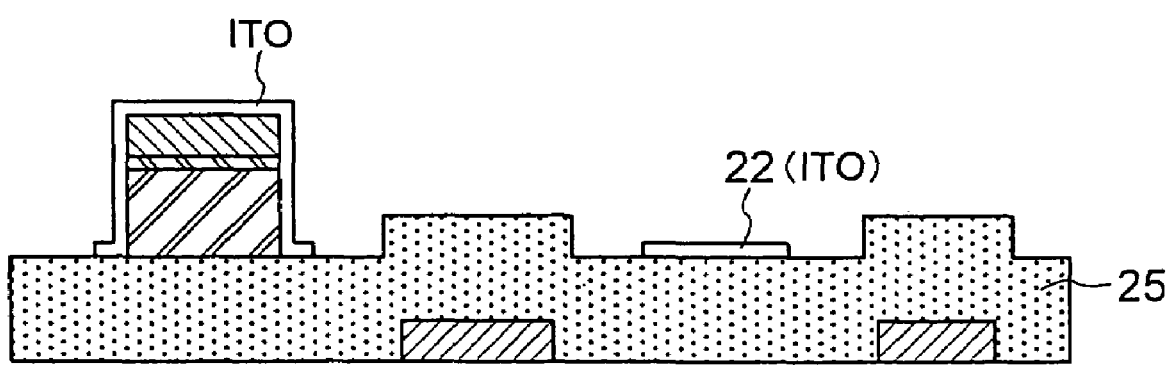
FIG. 24I is a sectional view taken along line I-I in FIG. 24G.

A transparent conductor film made of ITO having a thickness of about 50 nm is then formed on the resultant TFT panel. The transparent conductor film is then patterned by a photolithographic etching process to leave portions thereof covering the signal lines 17, drain electrodes 21A, source electrodes 21B, and pixel electrodes 22. Portions of the metallic film exposed from the patterned transparent film are then removed by etching. The resultant. TFT panel after the etching is shown in FIGS. 24G to 24I.

Figure 24J:
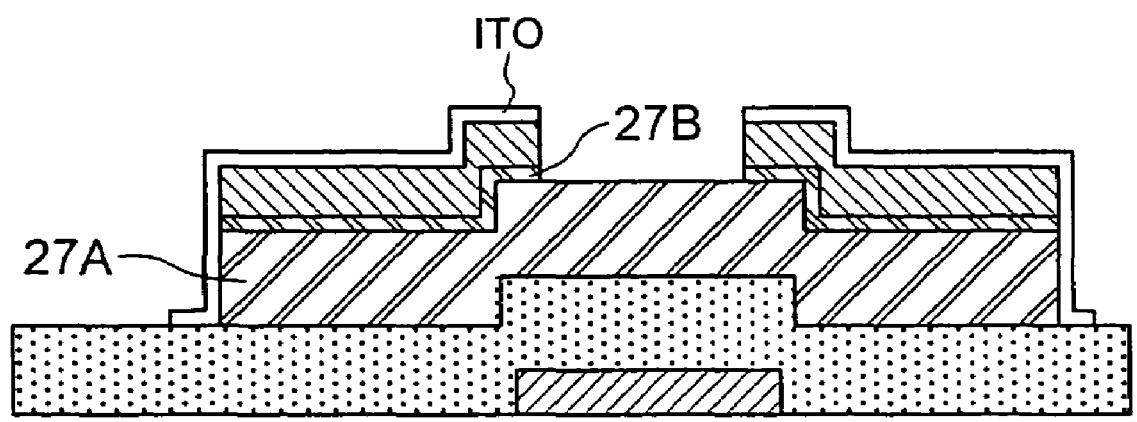
FIG. 24J is a sectional view taken along line H-H in FIG. 24G after a fourth step.
Figure 24K:
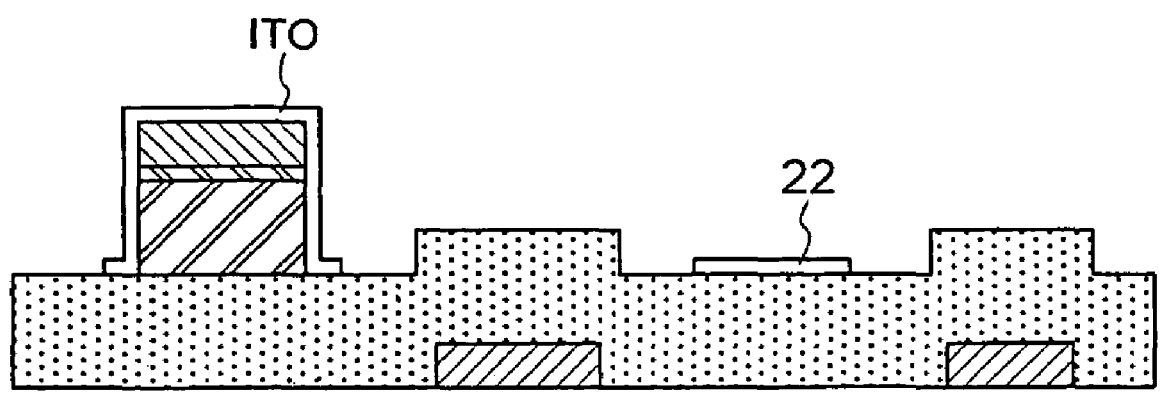
FIG. 24K is a sectional view taken along line I-I in FIG. 24G after the fourth step.

By using the patterned transparent conductor film (or the mask pattern used for patterning the transparent conductor film) as a mask, exposed portions of the n-type amorphous silicon film 27B is then etched to form a channel gap. The resultant TFT panel is shown in FIGS. 24J and 24K.

Thereafter, a passivation film 26 made of silicon nitride having a thickness of about 300 nm is formed on the resultant TFT panel by using a plasma-enhanced CVD process. The passivation film 26 is then patterned to leave portions thereof covering the signal terminals, scanning terminals 20 and common terminals 24A and 24B, followed by patterning the gate insulating film 25, thereby exposing the signal terminals made of transparent conductor film, scanning terminals 20 and common terminals 24A and 24B. Finally, an annealing process is conducted at a temperature of about 280° C. to complete the TFT panel having the pixel shown in FIGS. 21, 22 and 23.

In the embodiments as described above, although the first level conductor layer exemplarily includes two-film layer including Al film and TiN film, the first level conductor layer may include three films such as TiN/Al/Ti films or two other films including Cr film and overlying ITO film. The TiN film may be made of nitride of another high-melting-point metal instead, wherein the nitrogen concentration is preferably above 25 atomic percents. The transparent conductor film may be replaced by nitride of a high-melting-point metal, such as TiN.

Combination of any two of coupling lines described in the respective embodiments as described above may be employed. For example, a TFT panel may include a first coupling line formed on the TFT panel outside the area for the pixel array and a second coupling line including a conductive paste, or a second coupling line formed on the COF or TCP or in the vertical driver IC.

Since the above embodiments are described only for examples, the present invention is not limited to the above embodiments and various modifications or alterations can be easily made therefrom by those skilled in the art without departing from the scope of the present invention.

What is claimed is:

1. A liquid crystal display (LCD) device comprising a TFT panel, a counter panel and liquid crystal interposed therebetween, said TFT panel comprising:

a transparent substrate;

a plurality of scanning lines overlying said transparent substrate to extend in a row direction;

a plurality of signal lines overlying said transparent substrate to extend in a column direction;

a plurality of common lines each corresponding to one of said scanning lines to extend in said row direction parallel to said one of said scanning lines, said scanning lines and said common lines are formed in a single layer so that at least one of said scanning lines and at least one of said common lines are arranged consecutively in said column direction and alternating from each other in parallel;

an array of pixels each disposed at an intersection between one of said scanning lines and one of said signal lines; and a coupling line extending in said column direction, said coupling line including a conductive paste or a conductive tape coupling said common lines together.

2. A liquid crystal display (LCD) device comprising a TFT panel, a counter panel, and liquid crystal interposed therebetween, said TET panel comprising:

a transparent substrate;

a plurality of scanning lines overlying said transparent substrate to extend in a row direction;

a plurality of signal lines overlying said transparent substrate to extend in a column direction;

a plurality of common lines each corresponding to one of said scanning lines to extend in said row direction parallel to said one of said scanning lines, said scanning lines and said common lines are formed in a single layer so that at least one of said scanning lines and at least one of said common lines are arranged consecutively in said column direction and alternating from each other in parallel; and an array of pixels each disposed at an intersection between one of said scanning lines and one of said signal lines, said TFT panel mounting thereon at least one driver block including a film member, a driver IC mounted on said film member for driving said scanning lines, and a coupling line for connecting said common lines together, said coupling line extending in a space between said film member and said driver IC.

3. The LCD device as defined in claim 2, wherein said film member is a chip-on-film (COF).

4. The LCD device as defined in claim 2, wherein terminals of said scanning lines are arranged in a zig-zag fashion on said TFT panel.

5. The LCD device as defined in claim 1, wherein said common lines are coupled together using different coupling structures on a first side with respect to coupling structures used on a second side of said substrate.

6. The LCD device as defined in claim 2, wherein said common lines are coupled together using different coupling structures on a first side with respect to coupling structures used on a second side of said substrate.

* * * * *